(12) United States Patent
Wu et al.

(10) Patent No.: US 12,189,963 B2
(45) Date of Patent: Jan. 7, 2025

(54) METHOD, DEVICE, AND COMPUTER PROGRAM PRODUCT FOR MIGRATING DATA

(71) Applicant: Dell Products L.P., Round Rock, TX (US)

(72) Inventors: Andy Ling Wu, Shanghai (CN); Yonghao Yu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/067,619

(22) Filed: Dec. 16, 2022

(65) Prior Publication Data

US 2024/0134536 A1  Apr. 25, 2024
US 2024/0231637 A9  Jul. 11, 2024

(30) Foreign Application Priority Data

Oct. 21, 2022 (CN) .......................... 202211296069.4

(51) Int. Cl.
    *G06F 3/06* (2006.01)
(52) U.S. Cl.
    CPC ............ *G06F 3/0619* (2013.01); *G06F 3/061* (2013.01); *G06F 3/0647* (2013.01); *G06F 3/067* (2013.01)
(58) Field of Classification Search
    CPC ...... G06F 3/0619; G06F 3/061; G06F 3/0647; G06F 3/067
    See application file for complete search history.

(56) References Cited

U.S. PATENT DOCUMENTS

| 2006/0158976 | A1* | 7/2006 | Fukunaga | G11B 20/1879 369/13.01 |
| 2010/0027150 | A1* | 2/2010 | Deguchi | G11B 5/4555 360/75 |
| 2010/0142275 | A1* | 6/2010 | Yogev | G11C 29/76 711/E12.008 |
| 2010/0293440 | A1* | 11/2010 | Thatcher | G06F 11/073 714/764 |
| 2023/0153214 | A1* | 5/2023 | Sun | G06F 3/0689 714/3 |

* cited by examiner

*Primary Examiner* — Jason W Blust
(74) *Attorney, Agent, or Firm* — Amin, Turocy & Watson, LLP (57) ABSTRACT

Data is migrated. For instance, in response to detection of a failed group in a drive of groups comprising respective blocks, it is determined whether the total number of groups in the drive that have failed is less than a predetermined threshold. Data associated with the failed group is migrated to a reserved group in a reserved space of the drive according to a determination that the total number is less than the predetermined threshold; and a read/write (I/O) request to the failed group is redirected to the reserved group based on a mapping relationship from the failed group to the reserved group. Consequently, data does not need to be repaired on an entire drive due to one failed write request and replacing the drive is avoided, thereby saving resources, time and labor, and improving the impact of the failed write request on the performance of a storage system.

20 Claims, 6 Drawing Sheets

METHOD, DEVICE, AND COMPUTER PROGRAM PRODUCT FOR MIGRATING DATA

RELATED APPLICATION

The present application claims the benefit of priority to Chinese Patent Application No. 202211296069.4, filed on Oct. 21, 2022, which application is hereby incorporated into the present application by reference herein in its entirety.

TECHNICAL FIELD

Embodiments of the present disclosure relate generally to the technical field of data storage, and more specifically to a method, a system, and a computer program product for migrating data.

BACKGROUND

When a write request to a drive (e.g., a disk) fails, the drive is no longer allowed to be accessed (for example, read/write access), and the data on the drive needs to be repaired. The failed write request is unreliable, because if the failed write request is left unprocessed, the subsequent read operation will not be able to read the correct data. In order to ensure data consistency, it is necessary to repair the data on the drive where the failed write request occurred.

SUMMARY

Embodiments of the present disclosure provide a method, a device, and a computer program product for migrating data.

In one example embodiment of the present disclosure, a method for migrating data is provided. The method includes: determining, in response to detection of a failed group in a drive, whether the total number of groups in the drive that have failed is less than a predetermined threshold, wherein the drive comprises a plurality of groups, and each group comprises a plurality of blocks; migrating data associated with the failed group to a reserved group in a reserved space of the drive according to a determination that the total number of groups in the drive that have failed is less than the predetermined threshold; and redirecting a read/write input/output (I/O) request to the failed group to the reserved group based on a mapping relationship from the failed group to the reserved group.

In another example embodiment of the present disclosure, a device for migrating data is provided. The device includes a processor and a memory, wherein the memory is coupled to the processor and stores instructions that, when executed by the processor, cause the device to perform the following actions: determining, in response to detection of a failed group in a drive, whether the total number of groups that have failed in the drive is less than a predetermined threshold, wherein the drive comprises a plurality of groups, and each group comprises a plurality of blocks; migrating data associated with the failed group to a reserved group in a reserved space of the drive according to a determination that the total number of groups in the drive that have failed is less than the predetermined threshold; and redirecting a read/write (I/O) request to the failed group to the reserved group based on a mapping relationship from the failed group to the reserved group.

In still another example embodiment of the present disclosure, a computer program product is provided. The computer program product is tangibly stored in a non-transitory computer-readable medium and includes computer-executable instructions, wherein the computer-executable instructions, when executed, cause a computer to execute the method or process according to the embodiments of the present disclosure.

This Summary part is provided to introduce the selection of concepts in a simplified form, which will be further described in the Detailed Description below. This Summary part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

The embodiments of the present disclosure will be described in more detail below with reference to the accompanying drawings. While certain embodiments of the present disclosure are shown in the accompanying drawings, it is to be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "including" and its variations should be understood as open-ended inclusion, i.e., "including but not limited to." The term "based on" should be understood as "at least in part based on." The term "an embodiment" or "the embodiment" should be understood as "at least one embodiment." The terms "first," "second," and the like may refer to different or identical objects, unless otherwise specifically indicated.

In addition, all specific numerical values herein are examples, which are provided only to aid understanding, and are not intended to limit the scope.

As mentioned above, a failed write request is unreliable for a storage system. To ensure data consistency, it is necessary to repair data on a drive when a write request to the drive fails.

However, with the development of data storage technologies, more and more large-capacity drives are used in storage systems. The size of a single drive can reach 10 TB or even larger, so the above repair process will be difficult to finish in a short time. The repair process for a single drive may take several weeks, not to mention the case where a plurality of drives have failed write requests at the same time.

In addition, through the failure analysis of drives, most drives are good even if there is a failed write request. Therefore, replacing a drive once it has a failed write request is often unnecessary, and it wastes hardware resources. The replacement of drives not only consumes a lot of hardware and labor costs, but also requires a lot of time to rebalance data after replacement.

As mentioned above, data consistency is ensured by repairing the data on the entire drive and then replacing that drive. Such repair process for data on the drive may lead to overprotection of the cluster, which further degrades the data efficiency and performance of the storage system.

By means of migration of data according to embodiments of the present disclosure, it will no longer be necessary to repair data on an entire drive due to a failed write request and then replace that drive; instead, groups in that drive are migrated, thereby saving computing and hardware resources as well as time and labor costs, and reducing the impact of the failed write request on the performance of a storage system.

The basic principles and some example implementations of the present disclosure are illustrated below with reference to FIG. 1 to FIG. 6. It should be understood that these example embodiments are given only to enable those skilled in the art to better understand and thus implement the embodiments of the present disclosure, and are not intended to limit the scope of the present disclosure in any way.

Figure 1:
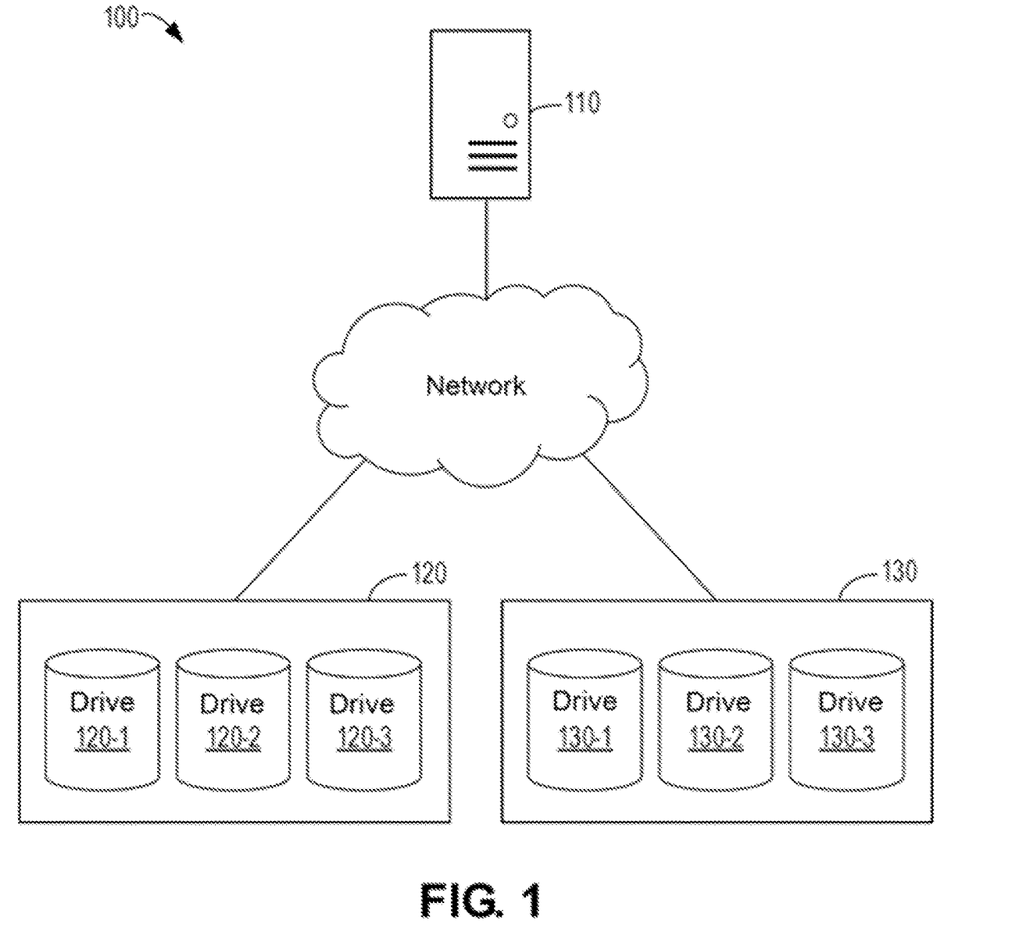
FIG. 1 illustrates a block diagram of an example environment according to some embodiments of the present disclosure.

FIG. 1 illustrates a block diagram of example environment 100 according to some embodiments of the present disclosure. As shown in FIG. 1, example environment 100 generally involves a distributed storage system. In some embodiments, example environment 100 includes electronic device 100 and storage nodes 120 and 130 that are connected to each other (for example, via a network).

Electronic device 110 may be a device with computing capabilities such as a personal computer, a workstation, a server, etc. The scope of the present disclosure is not limited in this regard. In some embodiments, electronic device 110 may access or perform operations on files stored on storage nodes 120 and 130 via a network, for example, creating new files, reading files, writing files, deleting files, migrating files, etc.

Storage nodes 120 and 130 may include clusters of storage devices such as drive arrays (i.e., disk arrays). As shown in FIG. 1, storage node 120 includes a plurality of drives 120-1, 120-2, 120-3, etc., and storage node 130 includes a plurality of drives 130-1, 130-2, 130-3, etc. In example environment 100 such as a distributed storage system, storage nodes 120 and 130 may be geographically distant from each other and may be collectively managed with the aid of the management software or hardware of the distributed storage system. It should be understood that environment 100 may include more or fewer storage nodes, and storage node 120 or 130 may include more or fewer drives. The scope of the present disclosure is not limited in this regard.

Although example environment 100 is illustrated as a distributed storage system, embodiments of the present disclosure may also be implemented in different environments. For example, embodiments of the present disclosure may include an implementation in an environment with a single storage node.

Figure 2:
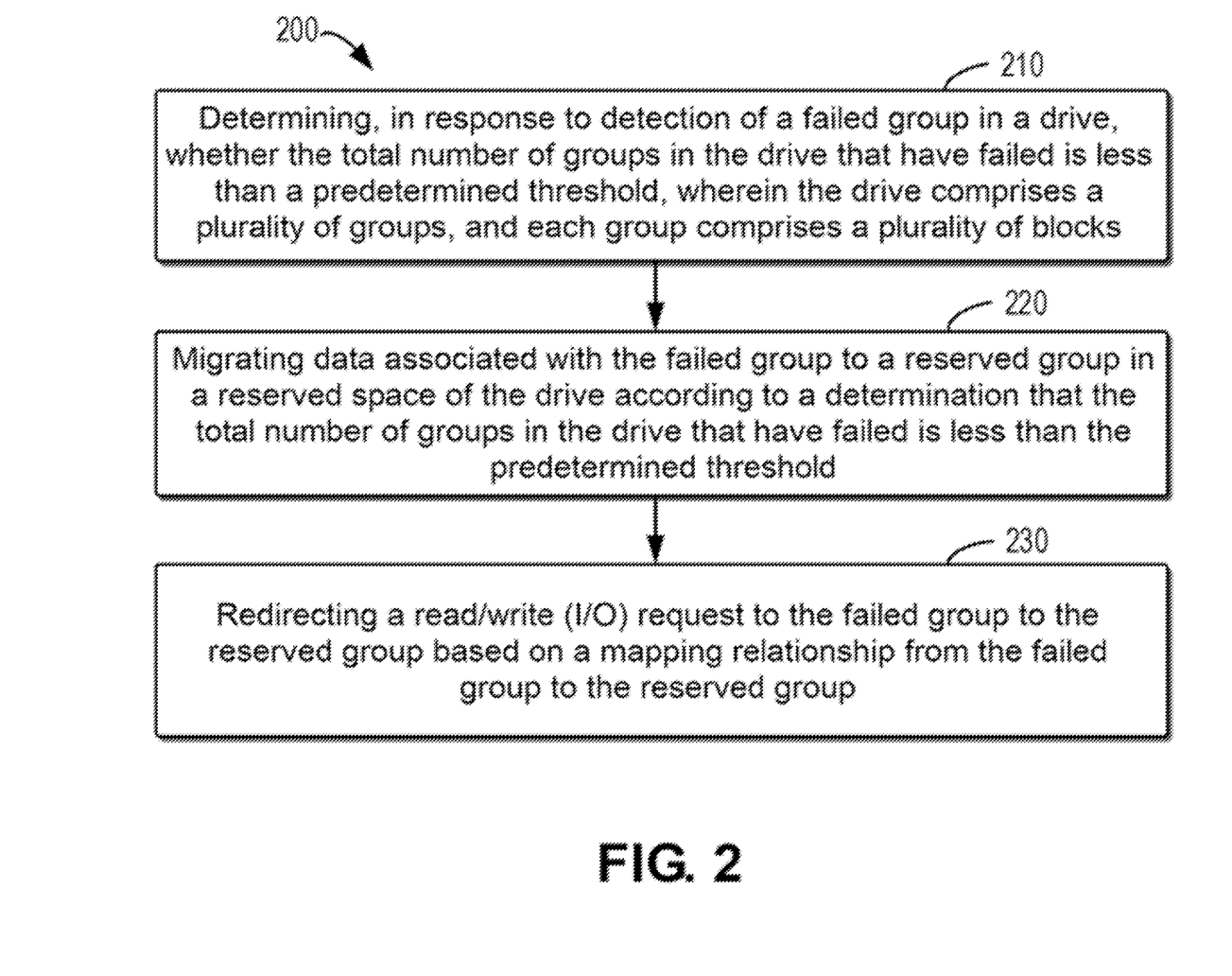
FIG. 2 illustrates a schematic flow chart of a method for migrating data according to some embodiments of the present disclosure.

To address at least some of the above problems, a method for migrating data is provided. FIG. 2 illustrates a schematic flow chart of method 200 for migrating data according to some embodiments of the present disclosure.

At 210, in response to detection of a failed group in a drive, it is determined whether the total number of groups in the drive that have failed is less than a predetermined threshold, wherein the drive comprises a plurality of groups, and each group comprises a plurality of blocks.

According to some embodiments of the present disclosure, a plurality of blocks on the drive are grouped into a plurality of groups. By way of example and not limitation, the groups in the drive may be cylinder groups (CGs). For example, the size of a block may be 8 KB, and the size of a group may be 32 M, that is, 1 group includes 4096 blocks. It should be understood that the sizes of the blocks and groups are not limited thereto, and each group and/or each block may have other sizes. According to some embodiments of the present disclosure, the groups according to embodiments of the present disclosure also include management blocks, such as marked blocks and history blocks.

In the case where a write request to the drive fails, according to some embodiments of the present disclosure, it is detected in which of the plurality of groups of that drive the failed write request appears, and that group is determined as the failed group.

According to some embodiments of the present disclosure, in response to detection of the failed group in the drive, other nodes in a plurality of storage nodes in a cluster are notified that the failed group is detected in the drive. The other nodes in the plurality of storage nodes may be notified of the identifier of the failed group, and the other nodes in the plurality of storage nodes may be notified that the failed group is being migrated or of an identifier of a reserved group in a reserved space in the same drive to which the failed group is migrated.

According to some embodiments of the present disclosure, the number of groups in the drive that have failed is counted, i.e., the number of groups in the drive in which a failed write request has been detected is counted. The total number of groups in the drive that have failed is compared with a predetermined threshold to check how many groups in total have failed in the past in a single drive.

At 220, data associated with the failed group is migrated to a reserved group in a reserved space of the drive according to a determination that the total number of groups in the drive that have failed is less than the predetermined threshold.

According to some embodiments of the present disclosure, drives in the storage nodes reserve space for migrating data, which is hereinafter referred to as reserved space. In the case where a write request to a drive fails, the data associated with the failed group is migrated to a reserved group in the reserved space of that drive.

As described above, the total number of groups in the drive that have failed is compared with a predetermined threshold. According to some embodiments of the present disclosure, the predetermined threshold is determined based on the size of the reserved space in the drive and the size of each group in the plurality of groups.

At 230, a read/write (I/O) request to the failed group is redirected to the reserved group based on a mapping relationship from the failed group to the reserved group.

According to some embodiments of the present disclosure, in response to the data associated with the failed group being migrated to the reserved group, the failed group is mapped to that reserved group, and the mapping relationship from the failed group to the reserved group is stored into a block in the reserved space of the drive. By way of example and not limitation, the block in the reserved space of the drive as described above may be an 8 KB SuperBlock. Storing the mapping relationship from the failed group to the reserved group in a block in the reserved space of the drive can prevent loss of data about this mapping relationship in the case of power failure or restart.

According to some embodiments of the present disclosure, the block storing the mapping relationship from the failed group to the reserved group will be backed up, and the block storing the mapping relationship from the failed group to the reserved group is backed up several times due to the importance of the mapping relationship from the failed group to the reserved group, so it is ensured that the mapping relationship from the failed group to the reserved group can still be acquired in the case of an unexpected situation.

Since a group among the plurality of groups that has a failed write request is determined as the failed group, no more reads or writes will be conducted for that failed group. According to some embodiments of the present disclosure, reads and writes for the failed group will be redirected to the reserved group based on the mapping relationship from that failed group to the reserved group.

It should be noted that if it is determined that the total number of groups in the drive that have failed is greater than or equal to the predetermined threshold, it means that there are too many failed write requests in the drive or too many groups in the drive have failed. In such case, according to an embodiment of the present disclosure, the data associated with the drive is migrated to other drives under the same storage node, such as a plurality of other drives under the same storage node.

Figure 3:
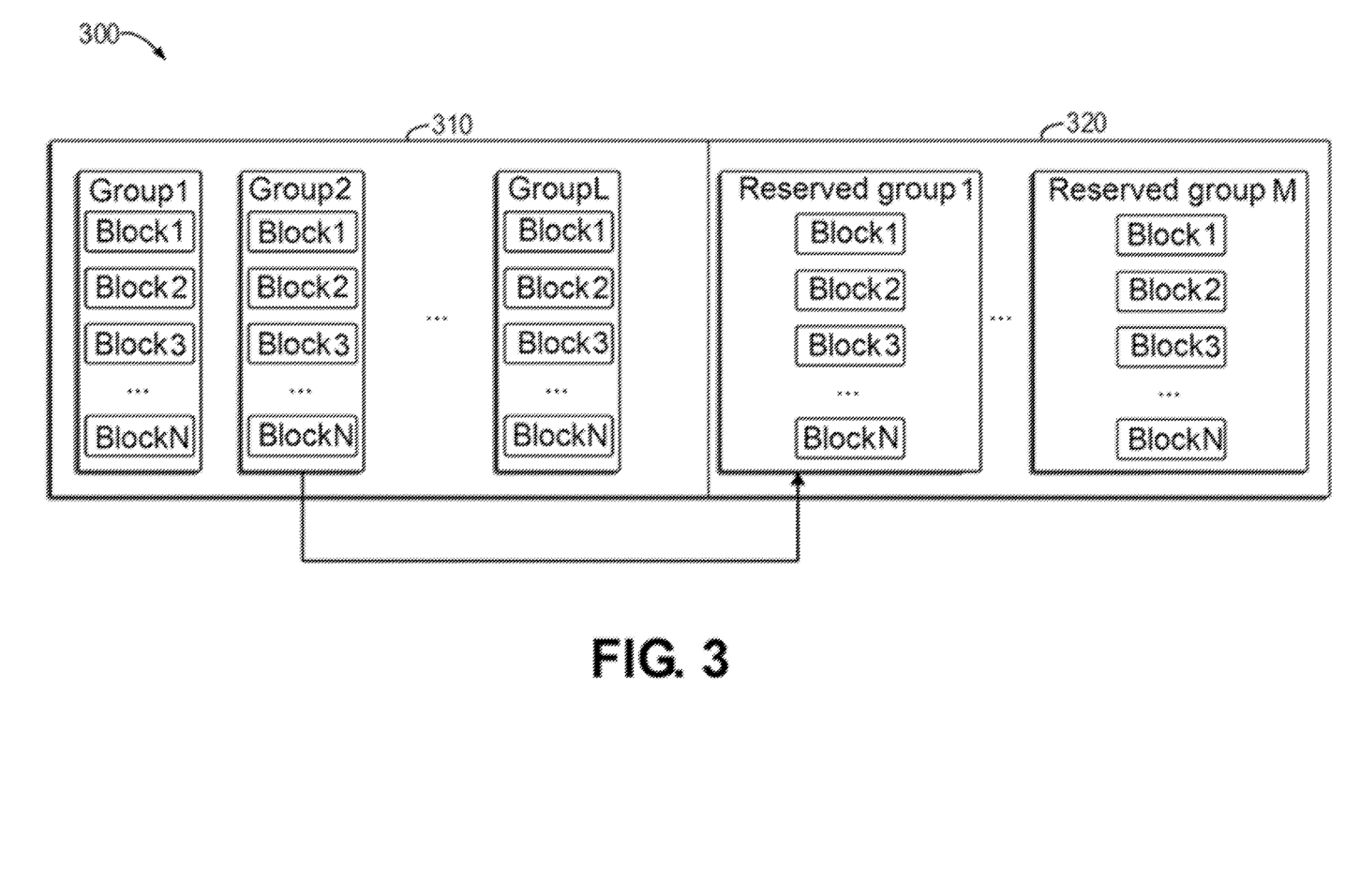
FIG. 3 illustrates a diagram of an example process for migrating data according to some embodiments of the present disclosure.

FIG. 3 illustrates example process 300 for migrating data according to some embodiments of the present disclosure.

As shown in FIG. 3, the drive includes storage space 310 and reserved space 320. It should be understood that the arrangement of storage space and reserved space in the drive is not limited to the example as shown in FIG. 3. Storage space 310 includes a plurality of groups for storing data, and reserved space 320 includes a plurality of reserved groups for migrating data in the case of a failed write request. In the example of FIG. 3, the number of the plurality of groups in storage space 310 is L, the number of the plurality of reserved groups in reserved space 320 is M, and each of the plurality of groups in storage space 310 and each of the plurality of reserved groups in reserved space 320 each include N blocks.

Example process 300 for migrating data is described below by way of example. It is assumed that during a write operation, a write request to group 2 in storage space 310 of the drive fails, for example, block 3 in group 2 cannot be written with data. In such case, block 3 in group 2 is considered a bad block, and group 2 is determined as a failed group.

Since group 2 in storage space 310 of the drive is determined as a failed group, read or write access to group 2 will no longer be allowed. The number of groups in the drive that have failed is counted.

If the total number of groups in the drive that have failed is less than the predetermined threshold, the data associated with group 2 (i.e., the failed group) in storage space 310 of the drive is migrated to, for example, reserved group 1 in reserved space 320 of the drive.

In response to the data associated with group 2 (i.e., the failed group) in storage space 310 of the drive being migrated to, for example, reserved group 1 in reserved space 320 of the drive, group 2 is mapped to reserved group 1, and the mapping relationship from group 2 to reserved group 1 is stored in reserved space 320 of drive 300, for example, in a block in reserved space 320. Based on the stored mapping relationship, a read/write (I/O) request to group 2 is redirected to reserved group 1.

Figure 4:
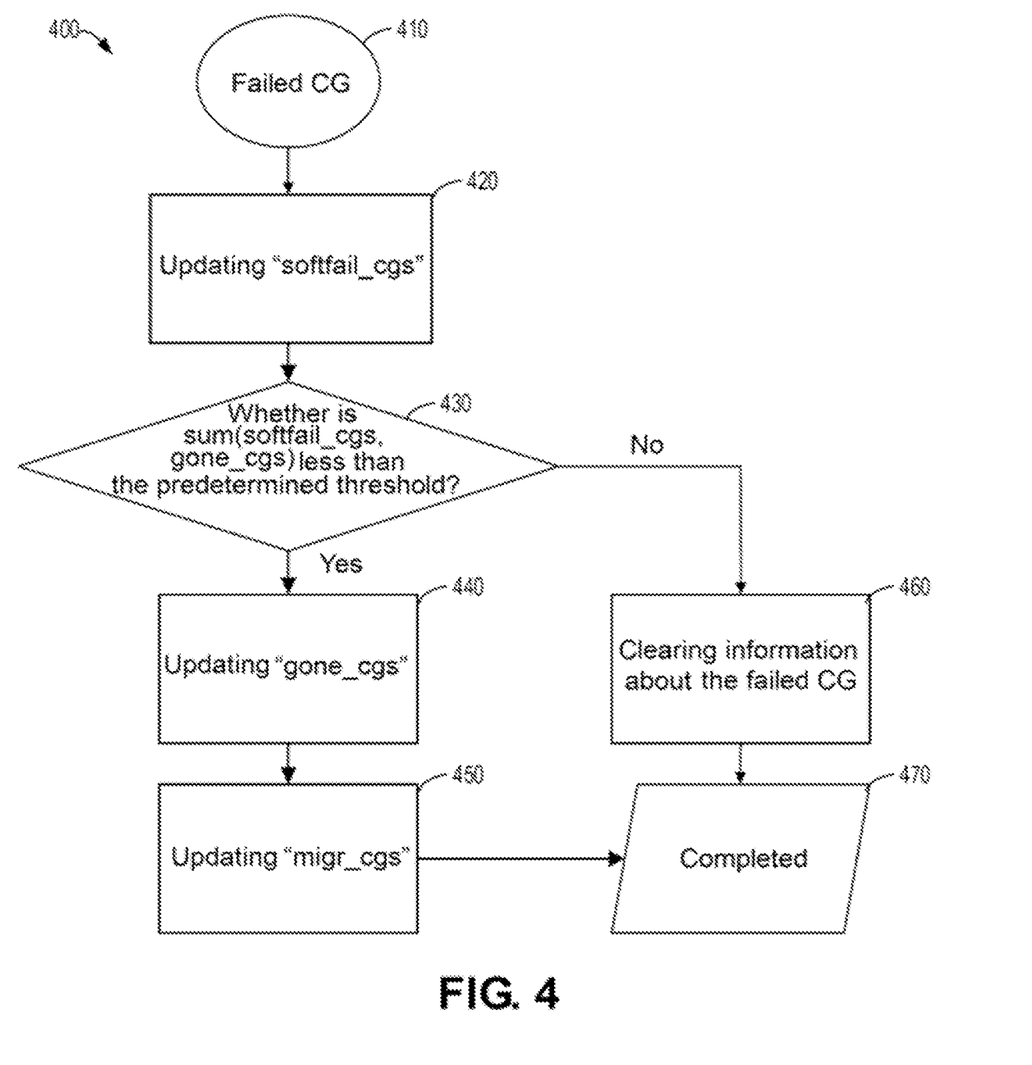
FIG. 4 illustrates an example process for updating group management information according to some embodiments of the present disclosure.

FIG. 4 illustrates example process 400 for updating group management information according to some embodiments of the present disclosure.

The update of group management information will be described below by taking groups in the drive being cylinder groups (CGs) as an example. It should be understood that embodiments of the present disclosure are not limited to CGs.

An example of group management information is given below to illustrate the update of group management information.

```
efs.gmp.extended_nodes: {devid=1, drives= {
  0 => GMP_DRIVE_UP ssd=0 softfail_cgs = none, gone_cgs = none,
  1 => GMP_DRIVE_UP ssd=0 softfail_cgs = {1234, 2234, 3234}, gone_cgs = none,
  2 => GMP_DRIVE_UP ssd=0 sofifail_cgs = none, gone_cgs = none,
  3 => GMP_DRIVE_UP ssd=0 softfail_cgs = none, gone_cgs = none,
  4 => GMP_DRIVE_UP ssd=0 softfail_cgs = none, gone_cgs = {7890(-1),7900(8900)},
  5 => GMP_DRIVE_UP ssd=0 softfail_cgs = none, gone_cgs = none
}
```

The above example of group management information illustrates group management information for six drives (i.e., drives 0-5). The attribute "softfail_cgs" indicates that there are failed write requests in CGs in the drive and that these failed CGs need to be migrated. For example, in the group management information for drive 2, "softfail_cgs={1234, 2234, 3234}" indicates that CGs in drive 2 that have CG identifiers of 1234, 2234, and 3234 are determined as failed CGs, and data associated with these failed CGs needs to be migrated. The attribute "gone_cgs" indicates that the failed CG is being migrated or indicates an identifier of a reserved group in a reserved space in the same drive to which the failed CG is migrated. For example, in the group management information for drive 4, "gone_cgs= [7890(-1),7900(8900)]" indicates that the failed CG having the CG identifier of 7890 in drive 4 is being migrated, and the failed CG having the CG identifier of 7900 has been migrated to the reserved CG having the CG identifier of 8900 in the reserved space of the same drive, i.e., the attribute "migr_cgs" is 8900. It should be understood that "softfail_cgs," "gone_cgs," and "migr_cgs" are only examples of naming.

Referring back to FIG. 4, example process 400 for updating group management information will further be described. It should be noted that such updating process is performed in a block in the reserved space of the drive, such as an 8 KB SuperBlock.

As shown in FIG. 4, at 410, a failed CG is detected in the drive. At 420, the "softfail_cgs" is updated in the group management information for that drive to indicate the identifier of the failed CG in the drive. At 430, the numbers of "softfail_cgs" and "migr_cgs" are added together to check how many CGs in total have failed in the past in a single drive. In the case of the above example, a total of 3 CGs have failed in drive 2, and a total of 2 CGs have failed in drive 4. The total number of "softfail_cgs" and "migr_cgs" is compared with a predetermined threshold. In response to the total number of "softfail_cgs" and "migr_cgs" being less than the predetermined threshold, "gone_cgs" is updated at 440. When the value of "gone_cgs" is the default value of "−1," it indicates that the failed CG in that drive is being migrated. After the migration is completed, at 450, the "migr_cgs" for "gone_cgs" is updated, wherein the value of "migr_cgs" indicates an identifier of the reserved group in the reserved space of the same drive to which the failed CG is migrated. In response to the total number of "softfail_cgs" and "migr_cgs" being equal to or greater than the predetermined threshold, information about the failed CG is cleared at 460. When the total number of "softfail_cgs" and "migr_cgs" is equal to or greater than the predetermined threshold, this means that there are too many failed write requests in the drive or too many CGs in the drive have failed. As such, the data on that drive is migrated to other drives under the same storage node, such as a plurality of other drives under the same node. At 470, the above update process is completed.

Figure 5:
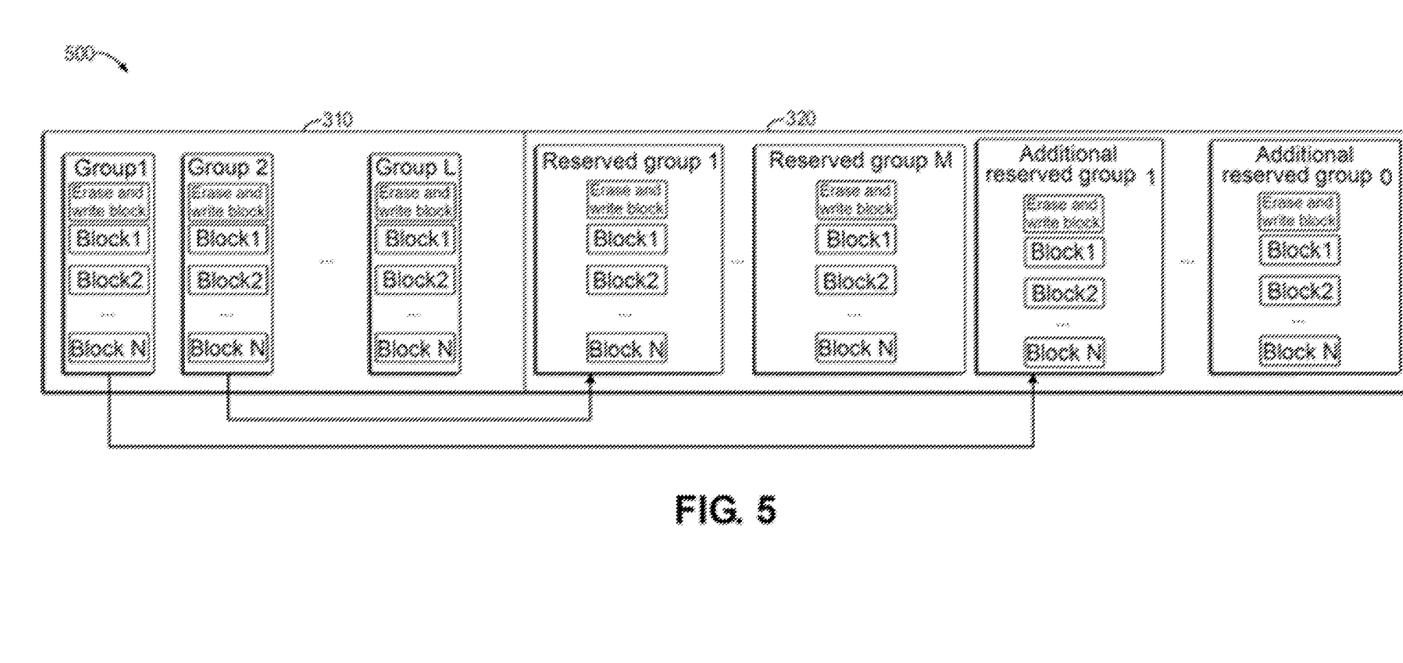
FIG. 5 illustrates an example process for testing an adjacent group according to an embodiment of the present disclosure.

To further improve the data efficiency and performance of the storage system, according to some embodiments of the present disclosure, an erase and write test is performed on a group adjacent to the failed group in the drive (also referred to as an adjacent group hereinafter) to determine whether the adjacent group is also a failed group.

FIG. 5 illustrates example process 500 for testing an adjacent group according to an embodiment of the present disclosure.

As shown in FIG. 5, the drive includes storage space 310 and reserved space 320. It should be understood that the arrangement of storage space and reserved space in the drive is not limited to the example as shown in FIG. 5. Storage space 310 includes a plurality of groups for storing data, and reserved space 320 includes a plurality of reserved groups for migrating data in the case of a failed write request. According to an embodiment of the present disclosure, reserved space 320 also includes a plurality of additional reserved groups for migrating data in the event of a test failure. In the example of FIG. 5, the number of the plurality of groups in storage space 310 is L, the number of the plurality of reserved groups in reserved space 320 is M, and the number of the plurality of additional reserved groups is O, and each of the plurality of groups in storage space 310 and each of the plurality of reserved groups and each of the plurality of additional reserved groups in reserved space 320 each include an erase and write block and N blocks.

Example process 500 for testing an adjacent group is described below by way of example. Assume that during a write operation, if a write request to group 2 in storage space 310 of the drive fails, group 2 is determined as a failed group. Group 1 adjacent to group 2 is tested to determine whether group 1 is also a failed group. According to an embodiment of the present disclosure, an erase and write test is performed on the erase and write block included in group 1. The erase and write test will write random data directly to the erase and write block included in group 1 and read the data later to ensure that the data read matches the data written. If the write fails or if the data read does not match the data written, group 1 (i.e., the adjacent group of failed group 2) is also determined as a failed group.

The number of groups in the drive that have failed is counted. If the total number of groups in the drive that have failed is less than the predetermined threshold, the data associated with group 1 (i.e., the adjacent group of failed group 2) in storage space 310 of the drive is migrated to, for example, additional reserved group 1 in reserved space 320 of the drive.

In response to the data associated with group 1 (i.e., the adjacent group of failed group 2) in storage space 310 of the drive being migrated to, for example, additional reserved group 1 in reserved space 320 of the drive, group 1 is mapped to additional reserved group 1, and the mapping relationship from group 1 to additional reserved group 1 is stored in reserved space 320 of drive 300, for example, in a block in reserved space 320. Based on the stored mapping relationship, a read/write (I/O) request to group 1 is redirected to additional reserved group 1.

Example process 500 for testing an adjacent group is described above by using one adjacent group as an example. It should be understood that the number of adjacent groups described above is an example and not limiting. During testing of an adjacent group according to embodiments of the present disclosure, more adjacent groups may be tested. The scope of the present disclosure is not limited in this regard.

According to another embodiment of the present disclosure, testing of the adjacent group may further include: migrating data associated with an adjacent group of the failed group to an additional reserved group in the reserved space of the drive in response to detection of the failed group in the drive. An erase and write test is then performed on the adjacent group of the failed group. In response to the adjacent group passing the erase and write test, data in the additional reserved group that is associated with the adjacent group passing the erase and write test is migrated back to that adjacent group. Moreover, in response to the adjacent group not passing the erase and write test, the adjacent group not passing the erase and write test is determined as a group that has failed.

During migration of the failed group, one or more blocks in the failed group may not be migrated from the failed group to the reserved group. According to an embodiment of the present disclosure, the types of blocks in the failed group that have failed in migration are determined. If the blocks in the failed group that have failed in migration are management blocks (such as marked blocks and history blocks) or empty blocks, then these blocks will be repaired later. However, in the case where the blocks in the failed group that have failed in migration are not management blocks, according to some embodiments of the present disclosure, blocks that are not management blocks or empty blocks among the blocks in the failed group that have failed in migration are added to a migration failure list, wherein the migration failure list is saved in a block in the reserved space of the drive, and the migration failure list is backed up several times due to its importance. The migration failure list according to some embodiments of the present disclosure cannot be manually cleared, but is cleared by rewriting or releasing.

By way of example and not limitation, improvements in the performance of the storage system as a result of the migration of data according to embodiments of the present disclosure will be described below. It is assumed that a group has a size of 32 M, and a block has a size of 8 KB. The migration of data according to embodiments of the present disclosure requires only reading 32 MB of data, writing 32 MB of data, and writing into several 8 KB blocks (e.g., a block for storing the mapping relationship from the failed group to the reserved group, the migration failure list, and backups of them). Such migration process can be completed in less than one minute, thus saving computing resources and time costs. Since the drive is no longer replaced just because of one single failed write request, the migration of data according to embodiments of the present disclosure is also advantageous for saving labor and hardware costs.

In summary, according to the embodiments of the present disclosure, it will no longer be necessary to repair data on an entire drive due to a failed write request and then replace that drive; instead, groups in that drive are migrated, thereby saving computing resources as well as time and hardware costs, and improving the impact of the failed write request on the performance of a storage system.

Figure 6:
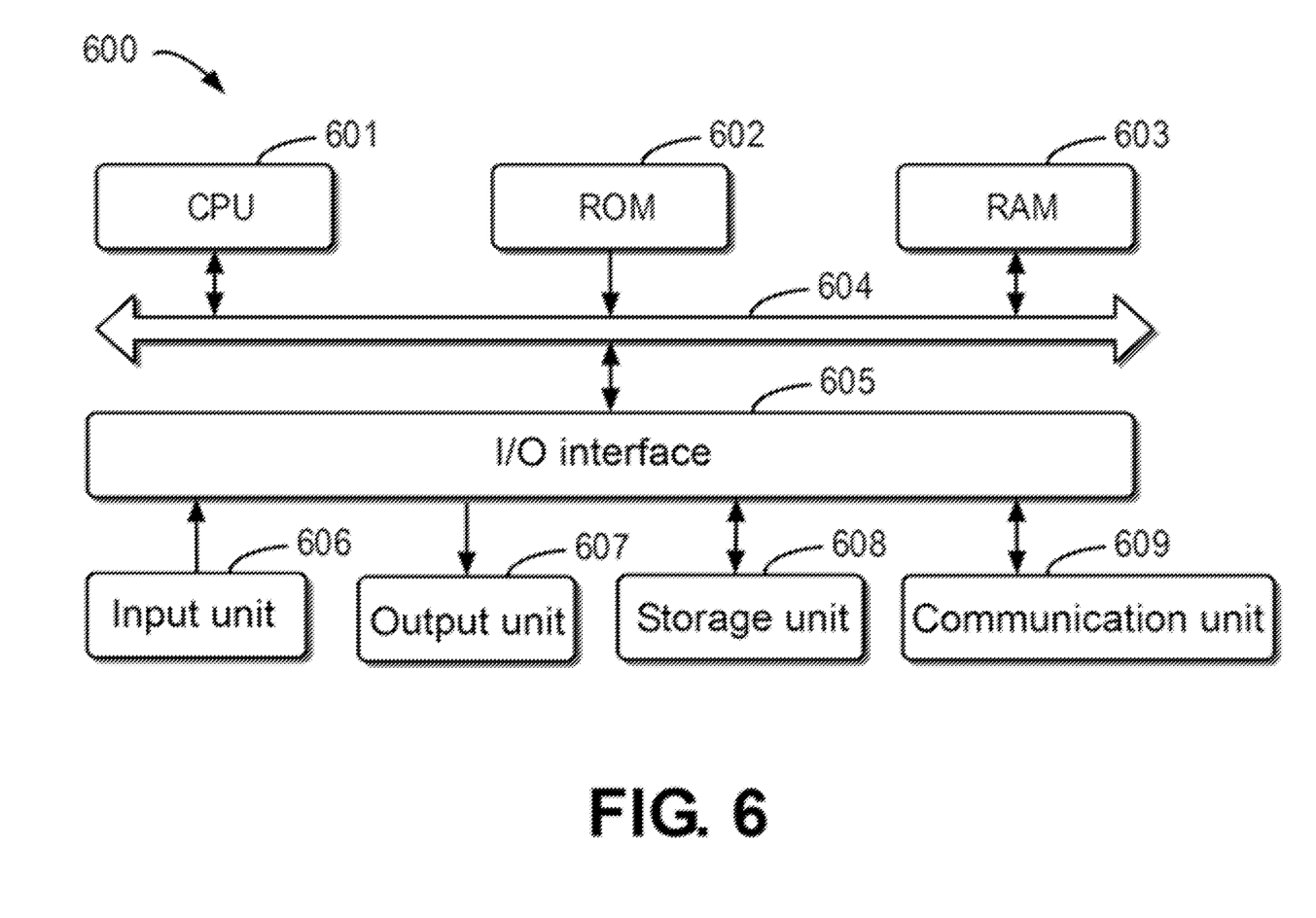
FIG. 6 illustrates a schematic block diagram of an example device that may be used to implement some embodiments of the present disclosure.

FIG. 6 illustrates a schematic block diagram of example device 600 that may be used to implement some embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network such as the Internet and/or various telecommunication networks.

The various processes and processing described above, such as method 200, may be performed by processing unit 601. For example, in some embodiments, method 200 may be implemented as a computer software program that is tangibly included in a machine-readable medium such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:
in response to detection of a failed group of a plurality of groups in a drive:
determining, by a system comprising a processor, whether a total number of groups in the drive that have failed is less than a defined threshold, wherein each group of the plurality of groups comprises a plurality of blocks; and
in response to a determination that the total number is less than the defined threshold:
migrating, by the system, first data associated with the failed group to a reserved group in a first reserved space of the drive, wherein the first reserved space comprises a plurality of reserved groups of the plurality of groups reserved for migration of data of failed groups;
migrating, by the system, second data from an adjacent group that is physically adjacent to the failed group in the drive to an additional reserved group in a second reserved space of the drive, wherein the second reserved space comprises at least one additional reserved group of the plurality of groups reserved for testing adjacent groups, and wherein the first reserve space is different from second reserve space;
performing, by the system, an erase and write test on the adjacent group, wherein the erase and write test erases the second data in the adjacent group, writes test data into the group that is physically adjacent to the failed group, and reads the test data from the adjacent group; and
redirecting, by the system, read requests and write requests for the failed group to the reserved group in the first reserved space based on a mapping relationship from the failed group to the reserved group in the first reserved space.

2. The method according to claim 1, further comprising:
mapping, by the system, the failed group to the reserved group in response to the data associated with the failed group being migrated to the reserved group; and
storing, by the system, the mapping relationship from the failed group to the reserved group into a block in the first reserved space of the drive; and
backing up, by the system, the block in the first reserved space.

3. The method according to claim 1, wherein the drive is comprised in a first node of nodes of a cluster, and the method further comprises:
notifying, by the system, a second node of the nodes in the cluster that the failed group exists in the drive in response to the detection of the failed group in the drive.

4. The method according to claim 3, wherein notifying the second node of the nodes in the cluster that the failed group exists in the drive comprises:
notifying the second node of an identifier of the failed group; and notifying the second node of at least one of that the failed group is being migrated, or an identifier of the reserved group to which the failed group is migrated.

5. The method according to claim 1, wherein the defined threshold is determined based on a size of the first reserved space and respective sizes of the groups.

6. The method according to claim 1, wherein the drive is a disk drive, and the groups are cylinder groups of the disk drive.

7. The method according to claim 1, further comprising:
migrating, by the system, the second data in the additional reserved group that is associated with the adjacent group back to the adjacent group in response to the adjacent group passing the erase and write test; and
determining, by the system, the adjacent group is failed in response to the adjacent group not passing the erase and write test.

8. The method according to claim 1, further comprising:
migrating, by the system, at least a portion of all data stored on the drive to other drives under a same node in response to a determination that the total number is greater than or equal to the defined threshold.

9. The method according to claim 1, further comprising:
determining, by the system, respective types of blocks in the failed group that have failed in migration; and
adding, by the system, blocks that are not management type blocks or empty type blocks among blocks in the failed group that have failed in migration to a migration failure list, wherein the migration failure list is saved in the first reserved space of the drive and is backed up, and wherein the migration failure list is cleared by rewriting or releasing data.

10. A device, comprising:
at least one processor; and
at least one memory coupled to the at least one processor and storing instructions, wherein the instructions, when executed by the at least one processor, cause the device to execute actions, comprising:
in response to detection of a failed group of a plurality of groups in a drive:
determining whether a total number of groups that have failed in the drive is less than a predetermined threshold, wherein each group of the plurality of groups comprises a plurality of blocks; and
in response to a determination that the total number is less than the predetermined threshold:
migrating first data associated with the failed group to a reserved group in a first reserved space of the drive, wherein the first reserved space comprises a plurality of reserved groups of the plurality of groups reserved for migrating data of failed groups;
migrating second data from an adjacent group that is physically adjacent to the failed group in the drive to an additional reserved group in a second reserved space of the drive, wherein the second reserved space comprises at least one additional reserved group of the plurality of groups reserved for testing adjacent groups, and wherein the first reserve space is different from second reserve space;
performing an erase and write test on the adjacent group, wherein the erase and write test erases the second data in the adjacent group, writes test data into the group that is physically adjacent to the failed group, and reads the test data from the adjacent group; and
redirecting read requests and write requests for the failed group to the reserved group in the first reserved space based on a mapping relationship from the failed group to the reserved group in the first reserved space.

11. The device according to claim 10, wherein the actions further comprise:
mapping the failed group to the reserved group in response to the second data associated with the failed group being migrated to the reserved group;
storing the mapping relationship from the failed group to the reserved group into a block in the first reserved space of the drive; and
backing up the block in the first reserved space.

12. The device according to claim 10, wherein the drive is comprised in a first node of nodes of a cluster, and the actions further comprise:
notifying a second node of the nodes in the cluster that the failed group exists in the drive in response to the detection of the failed group in the drive.

13. The device according to claim 12, wherein notifying the second node of the nodes in the cluster that the failed group exists in the drive comprises:
notifying the second node of an identifier of the failed group; and
notifying the second node of at least one of that the failed group is being migrated, or an identifier of the reserved group to which the failed group is migrated.

14. The device according to claim 10, wherein the predetermined threshold is determined based on a size of the first reserved space and a size of each of the groups.

15. The device according to claim 10, wherein the drive is a disk drive, and the groups are cylinder groups of the disk drive.

16. The device according to claim 10, wherein the actions further comprise:
migrating the second data in the additional reserved group that is associated with the adjacent group back to the adjacent group in response to the adjacent group passing the erase and write test; and
determining the adjacent group is failed in response to the adjacent group not passing the erase and write test.

17. The device according to claim 10, wherein the actions further comprise:
migrating data associated with the drive to other drives under a same node in response to a determination that the total number is greater than or equal to the predetermined threshold.

18. The device according to claim 10, wherein the actions further comprise:
determining types of blocks in the failed group that have failed in migration; and
adding blocks, which are not management type blocks or empty type blocks among blocks, in the failed group that have failed in migration to a migration failure list, wherein the migration failure list is saved in the first reserved space of the drive and is backed up, and the migration failure list is cleared by rewriting or releasing data.

19. A computer program product stored on a non-transitory computer-readable medium and comprising computer-executable instructions, wherein the computer-executable instructions, when executed via at least one processor, facilitate performance of operations, comprising:

in response to detection of a failed group of groups in a drive:
  determining whether a total number of groups that have failed in the drive is less than a predetermined threshold, wherein each group of the groups comprises blocks; and
  in response to a determination that the total number is less than the predetermined threshold:
    migrating first data associated with the failed group to a reserved group in a first reserved space of the drive, wherein the first reserved space comprises reserved groups of the groups reserved for migrating data of failed groups;
    migrating second data from an adjacent group that is physically adjacent to the failed group in the drive to an additional reserved group in a second reserved space of the drive, wherein the second reserved space comprises at least one additional reserved group of the groups reserved for testing adjacent groups, and wherein the first reserve space is different from second reserve space;
    performing an erase and write test on the adjacent group, wherein the erase and write test erases the second data in the adjacent group, writes test data into the group that is physically adjacent to the failed group, and reads the test data from the adjacent group; and
    redirecting a read requests and write requests for the failed group to the reserved group in the first reserved space based on a mapping relationship from the failed group to the reserved group in the first reserved space.

20. The computer program product of claim 19, wherein the operations further comprise:
  mapping the failed group to the reserved group in response to the second data associated with the failed group being migrated to the reserved group;
  storing the mapping relationship from the failed group to the reserved group into a block in the first reserved space of the drive; and
  backing up the block in the first reserved space.

\* \* \* \* \*